(12) United States Patent
Bohn (10) Patent No.: US 10,394,033 B2
(45) Date of Patent: Aug. 27, 2019

(54) PARALLEL BEAM FLEXURE MECHANISM FOR INTERPUPILLARY DISTANCE ADJUSTMENT

(71) Applicant: David D. Bohn, Fort Collins, CO (US)

(72) Inventor: David D. Bohn, Fort Collins, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/291,033

(22) Filed: Oct. 11, 2016

(65) Prior Publication Data

US 2018/0101014 A1 Apr. 12, 2018

(51) Int. Cl.
*G02B 7/12* (2006.01)
*G02B 27/01* (2006.01)
*G02B 21/20* (2006.01)

(52) U.S. Cl.
CPC ........... *G02B 27/0176* (2013.01); *G02B 7/12* (2013.01); *G02B 21/20* (2013.01); *G02B 2027/0134* (2013.01); *G02B 2027/0154* (2013.01)

(58) Field of Classification Search
CPC .................................. G02B 7/12; G02B 21/20
USPC .................. 359/409, 411, 412, 462, 473
See application file for complete search history.

(56) References Cited

U.S. PATENT DOCUMENTS

| 1,497,294 A * | 6/1924 | Erfle | G02B 7/12 |
| | | | 359/412 |
| 5,949,575 A * | 9/1999 | Matsumoto | G02B 23/18 |
| | | | 359/409 |
| 8,120,847 B2 | 2/2012 | Chang | |
| 8,390,675 B1 | 3/2013 | Riederer | |
| 8,477,425 B2 | 7/2013 | Border et al. | |
| 9,025,252 B2 | 5/2015 | Lewis et al. | |
| 9,128,283 B1 | 9/2015 | Heinrich et al. | |
| 9,128,284 B2 | 9/2015 | Cazalet | |
| 9,151,954 B2 | 10/2015 | Magyari et al. | |
| 9,202,443 B2 | 12/2015 | Perez et al. | |
| 2004/0070825 A1 * | 4/2004 | Charlesworth | G02B 7/12 |
| | | | 359/462 |
| 2004/0238732 A1 | 12/2004 | State et al. | |
| 2010/0110368 A1 | 5/2010 | Chaum | |

(Continued)

OTHER PUBLICATIONS

Lanman, et al., "Near-Eye Light Field Displays", In Proceedings of ACM SIGGRAPH Emerging Technologies, Jul. 2013, 10 Pages.

(Continued)

*Primary Examiner* — Audrey Y Chang
(74) *Attorney, Agent, or Firm* — Newport IP, LLC; Scott Y. Shigeta (57) ABSTRACT

A parallel beam flexure mechanism ("PBFM") for adjusting an interpupillary distance ("IPD") of an optical device is disclosed. The PBFM includes a plurality of flexures, a mounting platen, an optical payload, and a horizontal translation mechanism. The mounting platen has a first end and a second end, where the mounting platen is attached to a first set of flexures that are in a parallel arrangement to a second set of flexures attached to a frame of an optical device, such as a head mounted display. The optical payload and horizontal translation mechanism are attached to the mounting platen, where the horizontal translation mechanism is configured to translate the mounting platen in a horizontal direction by bending the flexures, thereby adjusting the IPD of the optical device.

7 Claims, 8 Drawing Sheets

(56) References Cited

U.S. PATENT DOCUMENTS

2013/0050642 A1  2/2013  Lewis et al.
2014/0375681 A1  12/2014 Robbins et al.
2015/0103306 A1  4/2015  Kaji et al.

OTHER PUBLICATIONS

"Viper HD R/T Binocular—50 mm Tactical Binocular Manual", Retrieved from https://web.archive.org/web/20150922133221/http://www.vortexoptics.com/uploads/web_manual_bin-viper-hd-rt-50-13a_.pdf, Sep. 22, 2015, 9 Pages.

* cited by examiner

PARALLEL BEAM FLEXURE MECHANISM FOR INTERPUPILLARY DISTANCE ADJUSTMENT

BACKGROUND

At present, there are a growing number of fields for mixed reality headsets that allow a user to visualize holographic or augmented images that are combined with the real-world physical environment to create a mixed reality environment. These fields include, for example, scientific visualization, medicine and military training, engineering design and prototyping, tele-manipulation and tele-presence, and personal entertainment systems.

Unlike mixed reality systems, in virtual reality ("VR") systems, VR headsets usually have opaque displays where computer-generated images, objects, or virtual scenes are displayed on the opaque displays while concurrently not allowing visualization of the outside real-world physical environment. Conversely, mixed reality systems (also known as augmented reality "AR" systems) usually have transparent displays that allow visualization of the outside real-world physical environment while concurrently displaying computer-generated holographic or augmented images. In other words, a mixed reality headset includes a transparent display that allows a user to see through the transparent display to the outside real-world physical environment while simultaneously seeing computer-generated holographic or augmented images on the transparent display, which are combined with the real-world physical environment to form a combined visual environment, in the field of view of the user. The combined visual environment includes both the real-world physical environment and the holographic or augmented images. In order to facilitate the illusion of three-dimensional depth, the displayed computer-generated images of the augmented objects are displayed independently to the left and right eyes of the user by the mixed reality headset (via independent displays for each eye) with a small binocular disparity between the augmented images. This binocular disparity is interpreted by the brain as indicative of a depth of the augmented object in the mixed reality environment.

Unfortunately, errors in the binocular disparity lead to problems with mixed reality headsets because small deviations in the in the position of the eyes of the user or binocular disparity can create a blurred image, discomfort, and loss of the three-dimensional effect. Specifically, deviations that cause horizontal errors in the position of the eyes of the user or binocular disparity generally result in errors of depth perception of the images. However, deviations that cause vertical error in the position of the eyes of the user or binocular disparity generally result in discomfort or headaches of the user because vertical misalignment between the eyes of the user result in overworking the brain of the user that is attempting to fuse the images together.

In order to minimize these effects, many mixed reality headsets are designed to have an interpupillary distance ("IPD") that is as wide as possible for a given design of a mixed reality headset. The IPD is the distance between the centers of the pupils of the two eyes of the user and is important for the design of a binocular system (i.e., a viewing system that has separate eyepieces or displays for each eye of the user), where both eye pupils of the user need to be positioned within the exit pupils (e.g. eyepieces or displays) of the viewing system. Since different users typically have different IPDs, the different IPDs may result in binocular disparity or errors of the position of the eyes of the user with relation to the individual displays in the mixed reality headsets. As such, there in a need for varying the IPD of the mixed reality headset to accommodate users with different IPDs.

Known approaches to varying the IPD of mixed reality headsets have included software approaches that provide corrective display adjustments and some mechanical adjustment systems. However, software approaches generally do not perform as well as mechanical adjustment systems. Unfortunately, known mechanical adjustment systems are typically overly complex, bulky, and have limited range of motion. Therefore, there is a need for an improved mechanical adjustment system that overcomes these limitations.

SUMMARY

Disclosed is a parallel beam flexure mechanism ("PBFM") for adjusting an interpupillary distance ("IPD") of an optical device. The PBFM includes a plurality of flexures, a mounting platen, an optical payload, and a horizontal translation mechanism. The mounting platen has a first end and a second end, where the first end of the mounting platen is attached to a first flexure and the second end of the mounting platen is attached to a second flexure. The first flexure is connected in a parallel arrangement with a third flexure that is attached to a frame of the optical device. The first flexure is connected to the third flexure by the use of an anchoring member that functions as a spacer between the first and third flexures. The second flexure is connected in a parallel arrangement with a fourth flexure that is attached to the frame of the optical device. The second flexure is connected to the fourth flexure by the use of an anchoring member that functions as a spacer between the second and fourth flexures. The optical payload and the horizontal translation mechanism are attached to the mounting platen, where the horizontal translation mechanism is configured to translate the mounting platen in a horizontal direction by bending the flexures. Horizontal translation of the mounting platen and the optical payload relative to another optical element thereby adjusts the IPD of the optical device.

In an example of operation, the PBFM performs a method that includes horizontally moving the mounting platen attached to the optics payload with the horizontal translation mechanism that is coupled to the mounting platen. The method also includes simultaneously deflecting the flexures attached to the mounting platen and the frame, in response to horizontally moving the mounting platen, thereby adjusting the IPD of the optical device.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

A parallel beam flexure mechanism ("PBFM") for adjusting an interpupillary distance ("IPD") of an optical device is disclosed. The PBFM includes a plurality of flexures, a mounting platen, an optical payload, and a horizontal translation mechanism. The mounting platen has a first end and a second end, where the first end of the mounting platen is attached to a first flexure and the second end of the mounting platen is attached to a second flexure. The first flexure is connected in a parallel arrangement with a third flexure that is attached to a frame of the optical device. The first flexure is connected to the third flexure by the use of an anchoring member that functions as a spacer between the first and third flexures. The second flexure is connected in a parallel arrangement with a fourth flexure that is attached to the frame of the optical device. The second flexure is connected to the fourth flexure by the use of an anchoring member that functions as a spacer between the second and fourth flexures. The optical payload and the horizontal translation mechanism are attached to the mounting platen, where the horizontal translation mechanism is configured to translate the mounting platen in a horizontal direction by bending the flexures. Horizontal translation of the mounting platen and the optical payload relative to another optical element thereby adjusts the IPD of the optical device.

In an example of operation, the PBFM performs a method that includes horizontally moving the mounting platen attached to the optics payload with the horizontal translation mechanism that is coupled to the mounting platen. The method also includes simultaneously deflecting the flexures attached to the mounting platen and the frame, in response to horizontally moving the mounting platen, thereby adjusting the IPD of the optical device.

Figure 1:
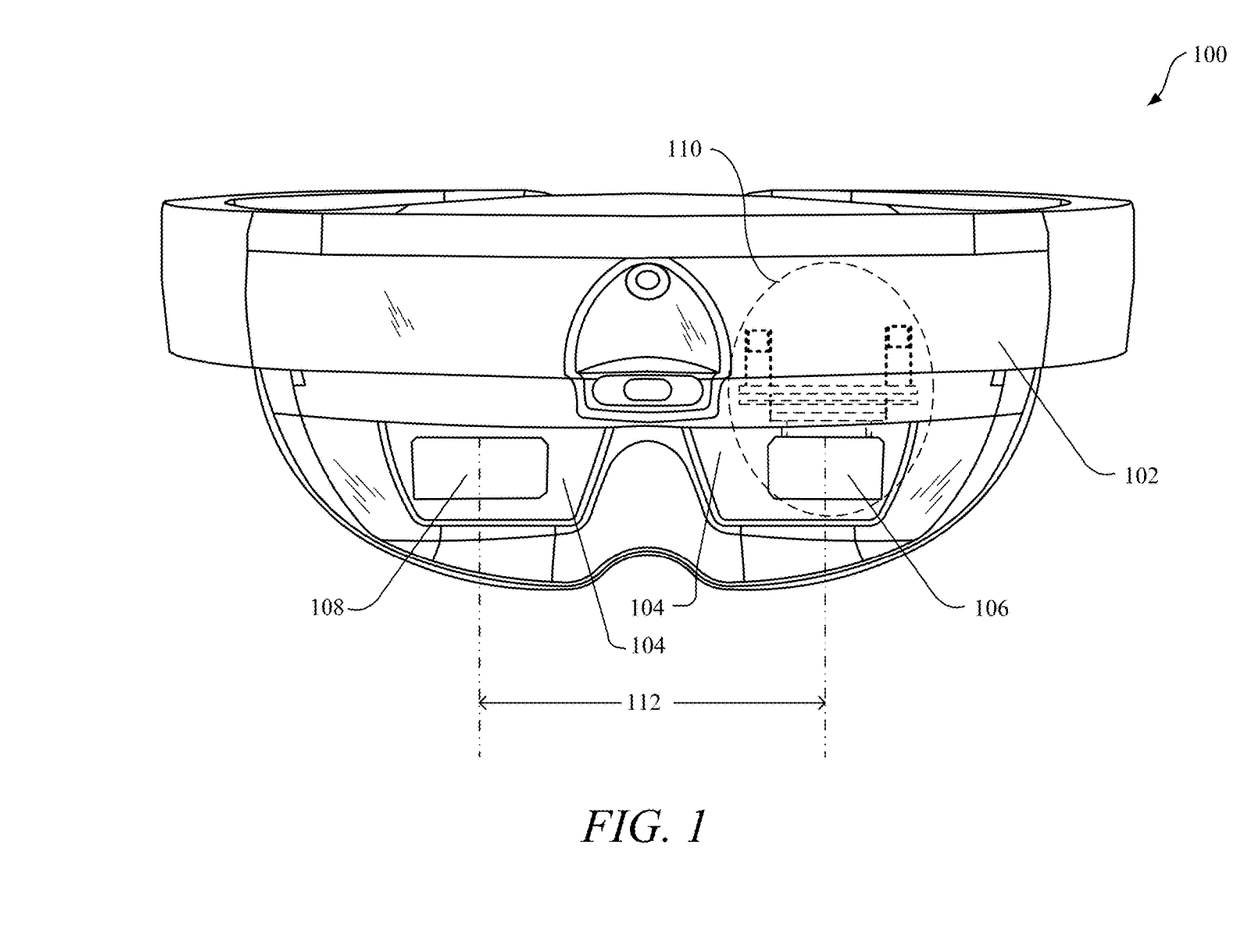
FIG. 1 is a front-view of an example of an implementation of a mixed reality headset in accordance with the present disclosure.

Referring now to FIG. 1, a front-view of an example implementation of a mixed reality ("MR") headset 100 (i.e., the optical device) is shown in accordance with the present disclosure. In this example, the MR headset 100 includes a body 102, transparent visor 104, and first optical payload 106 and a second optical payload 108 (also referred to herein as "optical elements"). The MR headset 100 also includes the PBFM 110 (also referred to herein as a "system") that is at least partially behind the transparent visor 104. In this example, the first optical payload 106 is part of the PBFM 110. The second optical payload 108 may also be part of a second PBFM (not shown), which can be the same as the first PBFM 110, alternatively, the second optical payload 108 can be in a fixed position relative to the MR headset 100. The first 106 and second 108 optical payloads are exit pupils (also known as "eyeboxes") of the display optics of the MR headset 100. The first optical payload 106 of the PBFM 110 and second optical payload 108 of the second PBFM (not shown) may be moved by the PBFM 110 and second PBFM to adjust the distance 112 between the center of the first optical payload 106 and the center of the second optical payload 108 so as to account for differing IPD between different users while simultaneously maintaining the binocular alignment between the PBFM 110 and second PBFM. As an example the distance may be initially set to value that is within the range of 53 mm to 71 mm that in general covers approximately 95% of the adult population.

Figure 2A:
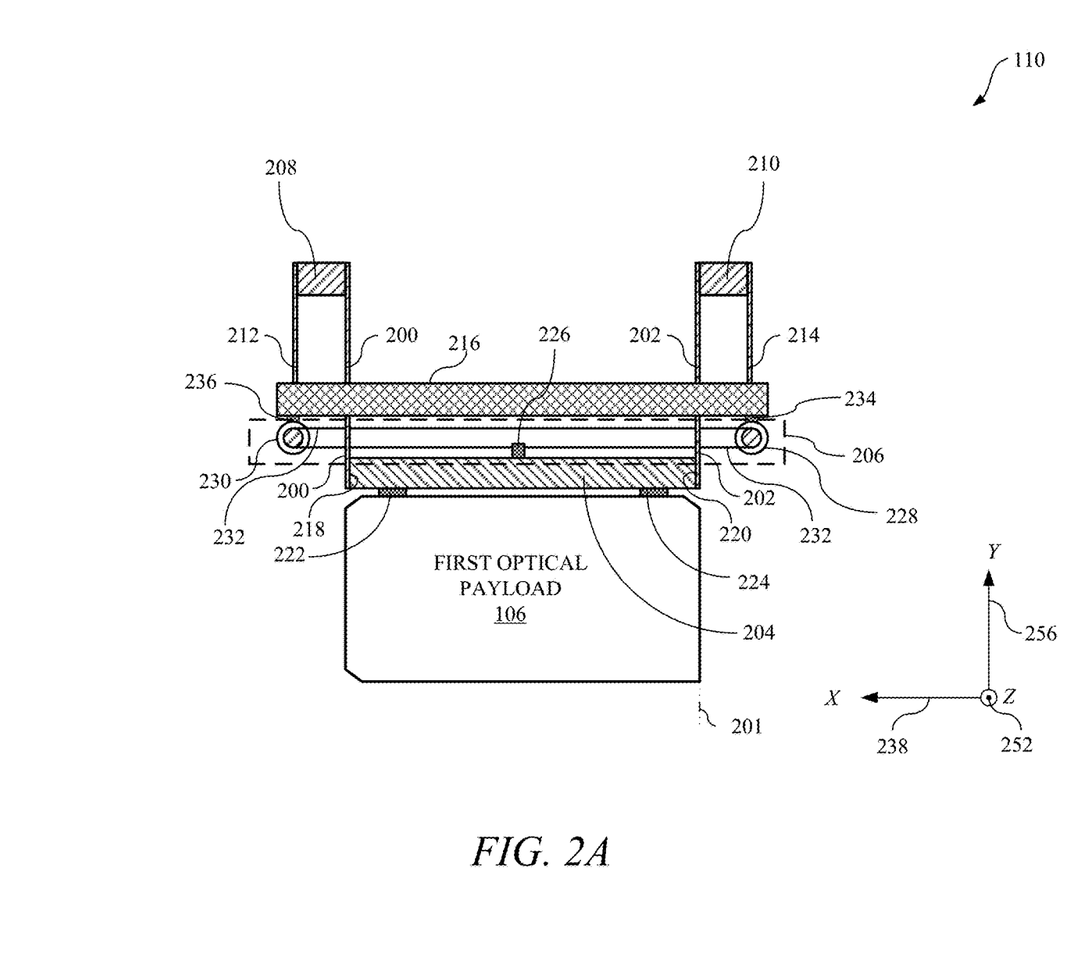
FIG. 2A is a front-view of an example of an implementation of a parallel beam flexure mechanism ("PBFM") for adjusting an interpupillary distance ("IPD") of the mixed reality headset, shown in FIG. 1, in a first position in accordance with the present disclosure.

Turning to FIG. 2A, a front-view of an example of an implementation of the PBFM 110 for adjusting the IPD of the MR headset 100 is shown in a first position 201 in accordance with the present disclosure. In this example, the PBFM 110 includes a first flexure 200 and a second 202 flexure, a mounting platen 204, the first optical payload 106, and a horizontal translation mechanism 206. The first 200 and second 202 flexures are flexural members that are generally compact, lightweight and are configured to have a spring-like deflection when a lateral force is applied on them and can be repeatedly flexed without disintegrating. As an example, the first 200 and second 202 flexures may be flexural members constructed of plastic applied on a glass substrate solution that are cured to form a flexible-type substrate or an adhesive layer of the flexible-type substrate placed directly on a glass substrate. Alternatively, the first 200 and second 202 flexures may be constructed of metal shim stock such as, for example, stainless steel, steel, beryllium copper, machined metal parts, monolithic molded parts with post machined flexures.

Additionally, the PBFM 110 also includes a first anchoring member 208, a second anchoring member 210, a third flexure 212, fourth flexure 214, and a frame 216, which can be a part of, or attached to, the MR headset 100. In this example, the mounting platen 204 has a first end 218 and a second end 220, where the first end 218 of the mounting platen 204 is attached to the first flexure 200 and the second end 220 of the mounting platen 204 is attached to the second flexure 202. The first flexure 200 is also attached to the first anchoring member 208 and the second flexure 202 is also attached to the second anchoring member 210. The first anchoring member 208 is also attached to the third flexure 212 and the second anchoring member 210 is also attached to the fourth flexure 214. The third flexure 212 and fourth flexure 214 are also attached to the frame 216. In this example, similar to the first 200 and second 202 flexures, the third flexure 212 and fourth flexure 214 are also flexural members that are generally compact, lightweight and are configured to have a spring-like deflection when a lateral force is applied on them and can be repeatedly flexed without disintegrating. The third flexure 212 and the fourth flexure 214 can be constructed in a manner described above with respect to the first flexure 200 and the second 202 flexure.

The anchoring members can be made from any suitable material, such as plastic or metal, for attaching and providing space between two flexures. An anchoring member can be any size suitable for producing a space between the attached flexures. In some illustrative examples, an anchoring member can be sized to produce a space between two attached flexures measuring between 3 mm and 15 mm. Such an example can be used with flexures having a length measuring between 15 mm and 30 mm.

The anchoring members can be configured to provide a suitable surface for attaching the flexures. For instance, flat surfaces on opposite sides of an anchoring member can be formed to receive an adhesive or any other suitable material or mechanical device for attaching the flexures to opposite sides of the anchoring member. The flexures can be attached to an anchoring member using any suitable method, some that may include, but are not limited to, a weld, solder, rivet, epoxy, snap-in mechanism, mechanical fastener, etc. The flexures can be attached to the frame 216 and the mounting platen 204 utilizing any suitable mechanism, including but not limited to, the examples described herein. In some configurations, as an optional feature, the first anchoring member 208 and second anchoring member 210 can be attached to a fixed location. This can be achieved by attaching the first anchoring member 208 and the second anchoring member 210 to the frame 216, or another fixed body, such as the body 102 of the MR headset 100.

The mounting platen 204 may also include one or more support members 222 and 224 that attach the first optical payload 106 to the mounting platen 204. In this example, the mounting platen 204 also includes an attachment node 226 that is attached to the horizontal translation mechanism 206.

Furthermore, in this example, the horizontal translation mechanism 206 includes a pulley type system that includes an adjustment wheel 228, rotatable cylinder 230, and cord 232 that is wrapped around the adjustment wheel 228 and rotatable cylinder 230 and attached to the attachment node 226. The cord 232 may be attached, connected, coupled, or bonded to the attachment node 226 utilizing, for example, a screw, adhesive, a knot, a staple, a small nail, or other attachment means. The cord 232 may be a thread, fiber, string, wire, cable, strip, ribbon, or belt of flexible material such as, for example, plastic, metal, fiberglass, carbon fiber, etc.

In this example, the horizontal translation mechanism 206 may be attached to the frame 216 via support members 234 and 236, where the first support member 234 is attached to the adjustment wheel 228 and the second support member 236 is attached to the rotatable cylinder 230. The adjustment wheel 228 may be attached to the cord 232 so as to translate a circular rotation of the adjustment wheel 228 to a linear translation of the cord 232 along a horizontal direction (in this example along an "X" direction 238) between the adjustment wheel 228 and the rotatable cylinder 230. Since the attachment node 226 is attached to the cord 232 and the mounting platen 204, any horizontal movement of the cord 232 in the X direction 238 will correspondingly result in the horizontal movement of the mounting platen 204 in the X direction 238, that will result in a lateral force that will deflect the flexures in X direction 238. It can be appreciated that this example of the horizontal translation mechanism 206 is provided for illustrative purposes and is not to be construed as limiting. Any suitable mechanism for applying a translational force to the mounting platen 204 can be used with the techniques disclosed herein.

It is appreciated by those of ordinary skill in the art that in this example, the second optical payload 108 may also be part of second PBFM (not shown) located on the other side of the MR headset 100, where the second PBFM may include the same type of elements, components, modules, and devices as the PBFM 110.

Figure 2B:
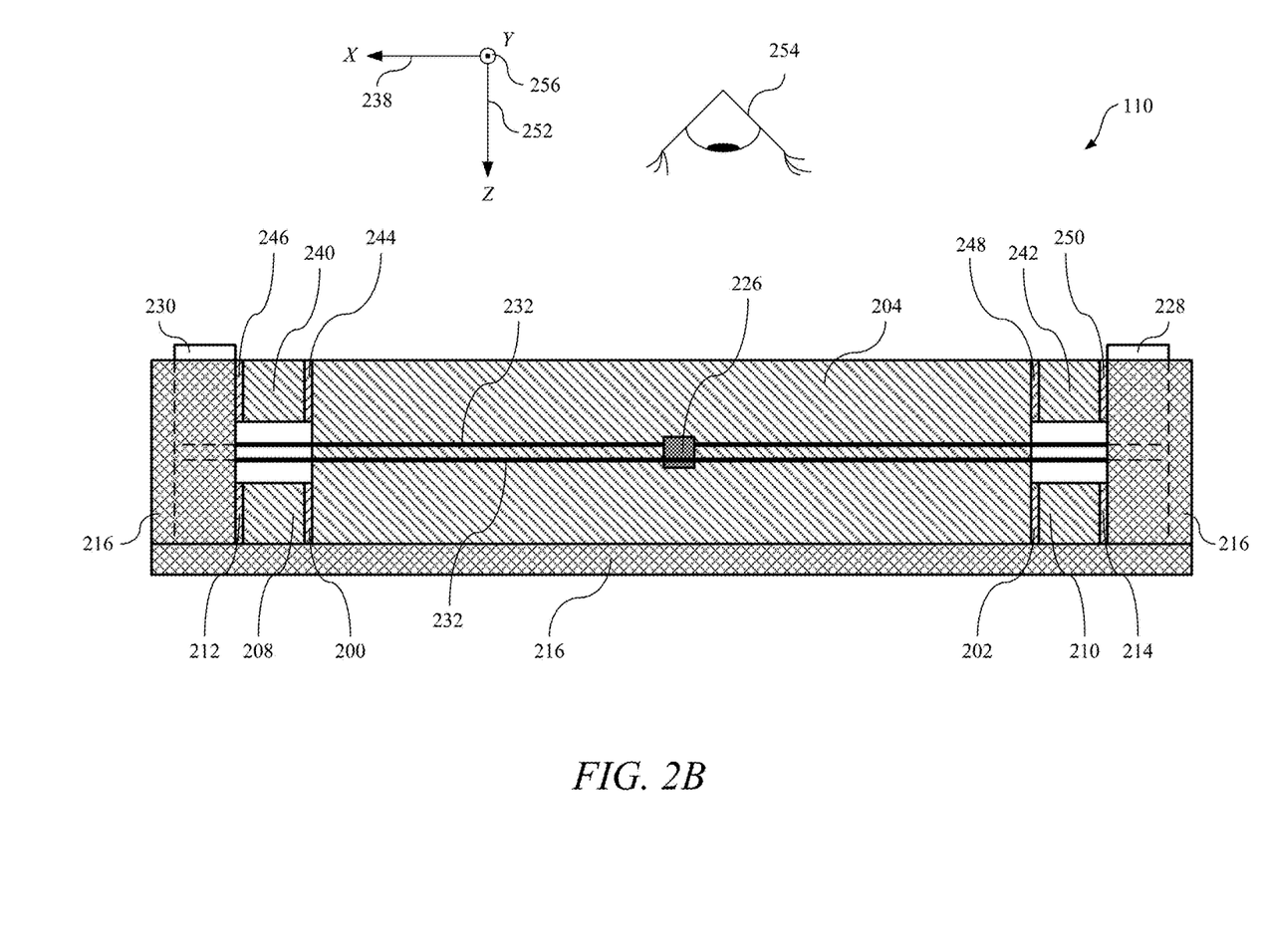
FIG. 2B is a top-view of the PBFM, shown in FIG. 2A, in accordance with the present disclosure.

In FIG. 2B, a top-view of the PBFM 110 is shown in accordance with the present disclosure. In this example, which include optional features, the PBFM 110 also includes a third 240 and fourth 242 anchoring members, a fifth 244 and sixth 246 flexures attached to the third 240 anchoring member, and a seventh 248 and eighth 250 flexures attached to the fourth 242 anchoring member. The fifth 244 and seventh 248 flexures are attached to the mounting platen 204 and the sixth 246 flexure and eighth 250 flexures are attached to the frame 216. In this example, the fifth 244 and seventh 248 flexures in combination with the first 200 and second 202 flexures, respectively, provide four points of contact between the mounting platen 204 and the frame 216. Configurations having four points of contact can cause stiffness and stability of the mounting platen 204, resulting in stiffness and stability of the attached first optical payload 106. Since the first optical payload 106 is a transparent member (such as, for example, a lens) that an individual eye 254 of a user of the MR headset 100 will see through in the Z-direction 252, it is important that the position of the first optical payload 106 is placed in a stable position in front of the eye 254 of the user that has small variations in the Y-direction 256 so as to not cause discomfort to the user.

Figure 2C:
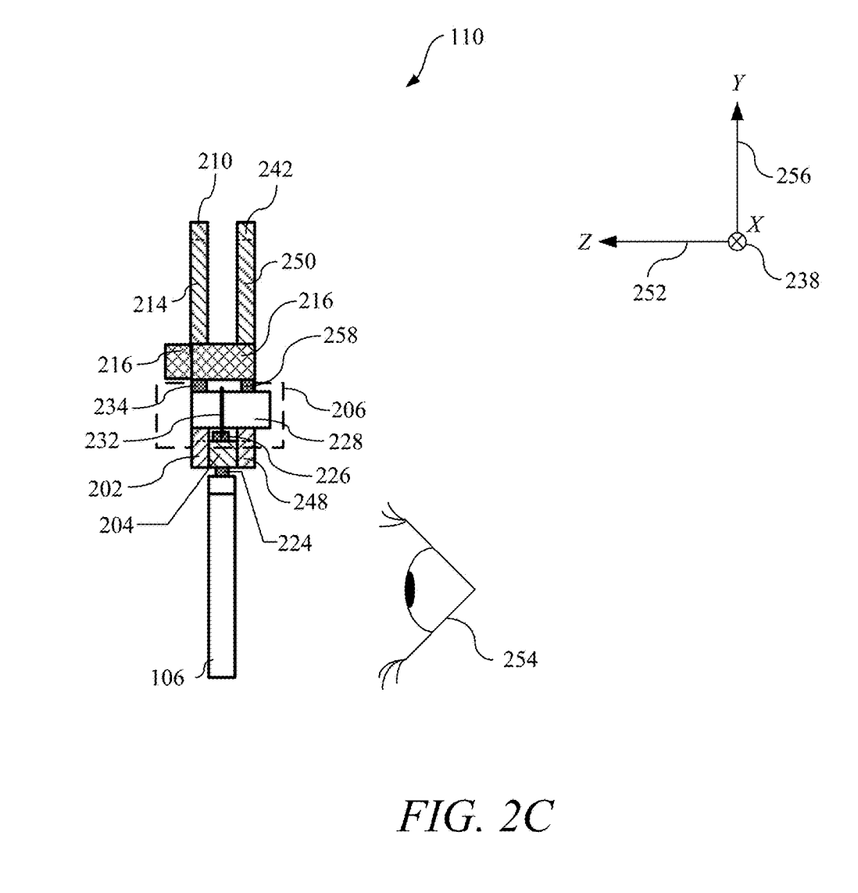
FIG. 2C is a side-view of the PBFM, shown in FIGS. 2A and 2B, in accordance with the present disclosure.

Turning to FIG. 2C, a side-view of the PBFM 110 is shown in accordance with the present disclosure. In FIG. 2C the same elements are shown that were introduced earlier in FIGS. 2A and 2B. However, FIG. 2C also includes a third support member 258 attaching the adjustment wheel 228 to the frame 216. The combination of the first 234 and third 258 support members are placed sufficiently apart from each other to allow the cord 232 to pass between them from the adjustment wheel 228.

Figure 3:
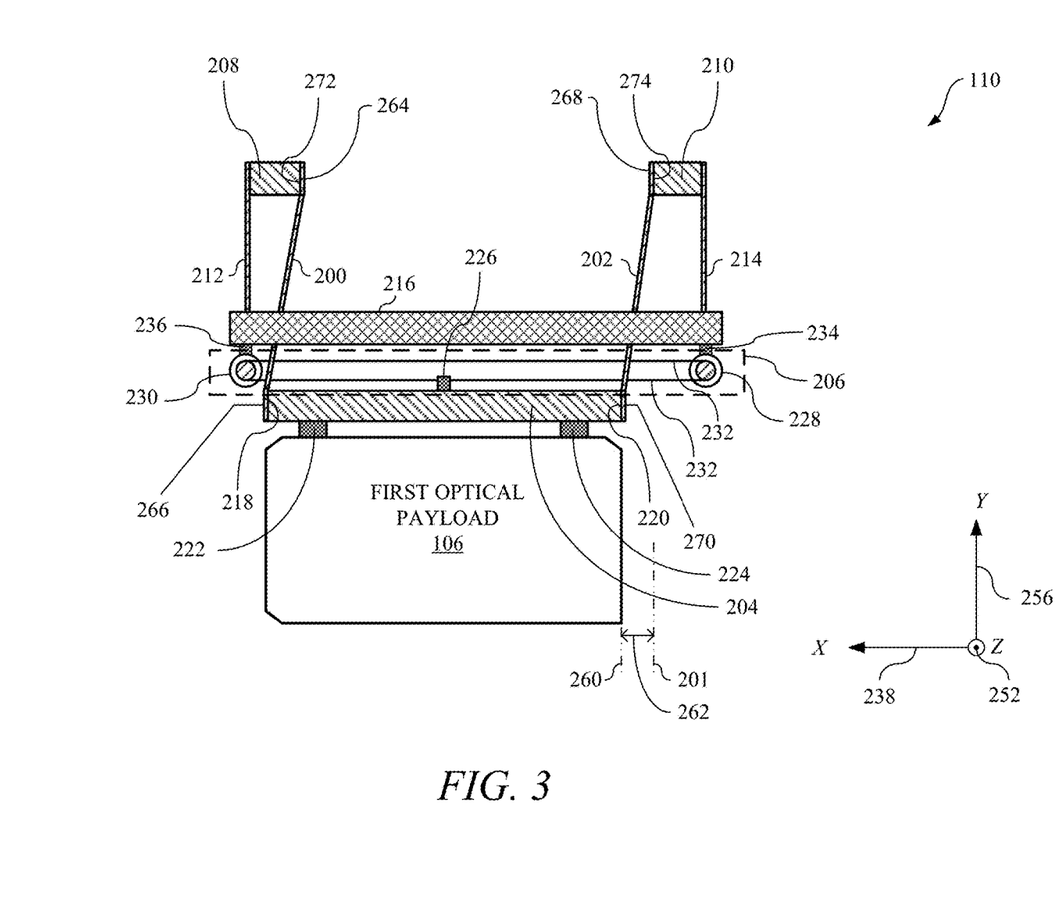
FIG. 3 is a front-view of the PBFM, shown in FIGS. 2A, 2B, and 2C, in a second position in accordance with the present disclosure.

In FIG. 3, a front-view of the PBFM 110 is shown in a second position 260 in accordance with the present disclosure. In this example, the second position 260 is horizontally to the left of the first position 201 in the X-direction 238, where the first 201 and second 260 positions are separated by a translation distance 262 that may be equal to approximately 4.5 mm. In this example, movement to the left along the X-direction 238 is defined as a positive movement of the first optical payload 106, while movement to the right along the negative X-direction 238 is defined as a negative movement of the first optical payload 106. As such, the total movement of the first optical payload 106 may be approximately 9 mm (i.e., approximately +/−4.5 mm in each direction along the X-direction 238). Similarly, the second optical payload 108 may also have a total movement of approximately 9 mm (i.e., approximately +/−4.5 mm), such that the total movement between both the first 106 and second 108 optical payloads may be as much as, for example, approximately 18 mm. Using this range of approximately +/−9 mm, the horizontal translation mechanism 206 is configured to allocate approximately 0.1 milliradian ("mrads") angle error (i.e., $\theta_x$) over an entire IPD range of approximately 53 mm to 71 mm, while maintaining a vertical misalignment (in the Y-direction 256) of approximately 0.1 mrads angle error (i.e., $\theta_y$), with a total allowable error from all sources being approximately 1.5. These values correspond to approximately +/−4.5 mm (per eye of the user) of travel in the horizontal direction (i.e., X-direction 238) with less than approximately 0.1 mm of error between the right and left eyes in the vertical direction (i.e., Y-direction 256) and less then approximately 0.1 mm of error between the right and left eyes in the normal direction of sight (i.e., Z-direction 252).

Specifically, the horizontal translation mechanism 206 is configured to provide an actuation force coincident with the center of force of the flexures to reduce or eliminate moment forces which could induce angular errors $\theta_y$. In an example of operation, the adjustment wheel 228 may be manual adjusted by the user using finger actuation with reasonable torque loading. In response, the adjustment wheel 228 will cause the cord 232 to move along the adjustment wheel 228 and in a positive or negative horizontal direction along the X-direction 238 to the rotatable cylinder 230. The resulting movement of the cord 232 will cause the movement of the attachment node 226, which may be a screw, adhesive, a knot, a staple, a small nail, or other attachment means, in the direction of movement of the cord 232. Since the attachment node 226 is attached to the mounting platen 204, the mounting platen 204 will also corresponding move in the direction of the attachment node 226 in either positive or negative horizontal direction along the X-direction 238. However, since the mounting platen 204 is attached to the first 200 and second 202 flexures at the first 218 and second 220 ends of the mounting platen 204, the movement of the mounting platen 204 will produce a lateral force that will correspondingly cause the flexures to deflect in the direction of motion of the mounting platen 204. In this example, the lateral force is shown to deflect the flexures to the left of the first position 201 but it is appreciated that if the mounting platen 204 were to move in the opposite direction, the lateral force would deflect the flexures to the right of the first position 201.

Specifically, as the mounting platen 204 moves in the x-direction 238, the movement deflects the flexures to the left to the second position 260 from the first position 201. As a result, the flexures are deflected to the left causing the flexures to bend between a first attachment portion 264 and a second attachment portion 266. The first attachment portion 264 is attached to a first surface 272 of the first anchoring member 208 and the second attachment portion 266 is attached to the first end 218 of the mounting platen 204. The use of the parallel flexures provide a smooth and accurate transition along the translation distance 262 from the first position 201 to the second position 260 while mitigating the variation errors in the vertical direction (i.e., Y-direction 256).

In this example, the adjustment wheel 228 may include a rotational clutch friction based adjustment system to maintain a set position of the mounting platen 204. Alternatively, or in addition, the horizontal translation mechanism 206 may also include a clutch friction based adjustment system to maintain the set position of the mounting platen 204. The horizontal translation mechanism 206 may also include springs (not shown) or other preloading devices to reduce or eliminate any backlash with the movement of the mounting platen 204.

It is appreciated that other types of horizontal translation mechanism 206 may also be utilized with the PBFM 110 that include screw type mechanisms such as, for example, a long screw that moves the attachment mode along the screw or a worm screw mechanism.

Figure 4:
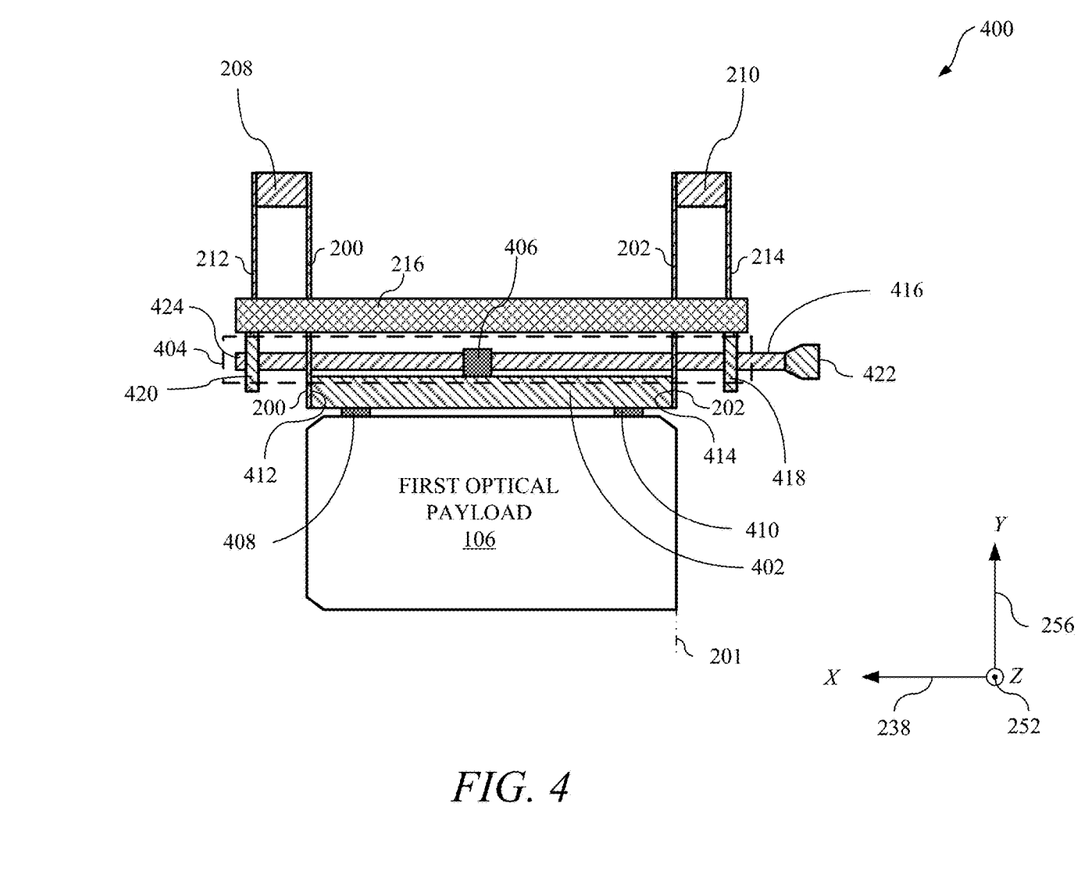
FIG. 4 is a front-view of an example of another implementation of the PBFM, in a first position in accordance with the present disclosure.

In FIG. 4, a front-view of an example of another implementation of the PBFM 400 is shown in a first position 201 in accordance with the present disclosure. Similar to the examples shown in FIGS. 2A through 3, the PBFM 400 includes the first optical payload 106, first 200 and second 202 flexures, first 208 and second 210 anchoring members, third 212 and fourth 214 flexures, and frame 216. Unlike the previous examples, in FIG. 4, the PBFM 400 includes a different type of mounting platen 402, horizontal translation mechanism 404, and attachment node 406. The mounting platen 402 includes supporting members 408 and 410 that are attached to the first optical payload 106 and a first end 412 and a second end 414, where the first end 412 of the mounting platen 402 is attached to the first flexure 200 and the second end 414 of the mounting platen 402 is attached to the second flexure 202. The attachment node 406 is attached to the mounting platen 402 and in this example is a threaded nut-type device. In this example, the attachment node 406 may be a part of the mounting platen 402 or a part that is connected or attached to the mounting platen 402 utilizing any known attachment means that may include, for example, adhesive, solder, welded, snap-in mechanism, mechanical fastener, etc.

In this example, the horizontal translation mechanism 404 includes a screw 416, and two support members 418 and 420. The horizontal translation mechanism 404 may also include a rotatable knob 422 configured to be hand turned by the fingers of a user of the MR headset 100. The first support member 418 may be support member that is attached to the frame 216 and has a through hole that the screw 416 passes through. The second support member 418 may include a mechanism to rotatably attach to the end 424 of the screw 416 allowing the screw 416 to rotate freely in both directions. The attachment node 406 is configured to interface with the screw 416 because the screw 416 is also attached the attachment node 406 by going through the threaded opening of the attachment node 406 (similar to a general nut-screw coupling) and coupling the threads of the opening of the attachment node 406 with the threads of the screw 416. As a result, as the screw 416 is rotated in one direction or another, the screw 416 transforms the rotational movement to horizontal movement along the threads of the screw 416 and the attachment node 406 is pulled either in a positive or negative horizontal direction along the X-direction 238 by the movement of the threads of the screw 416.

As another example of an implementation, the horizontal translation mechanism may utilize a worm screw that is attached to the first 418 and second 420 support members in the same was as in the example described in FIG. 4. However, instead of utilizing an attachment node that is a thread-nut-type device or structure, the attachment node configured to interface with the worm screw by being a worm gear surface that may run along the surface of the mounting platen. Where the worm gear surface includes threads that couple with the threads of the screw so as to move the attachment node (and correspondingly the mounting platen) horizontally along the threads of the screw. Alternatively, the attachment node may be attached to the surface of the mounting platen so as to protrude out from the surface of the mounting platen. In this example, the attachment node would have a top surface that includes threads that couple to the threads of the screw so as to move the attachment node (and correspondingly the mounting platen) horizontally along the threads of the screw.

Figure 5:
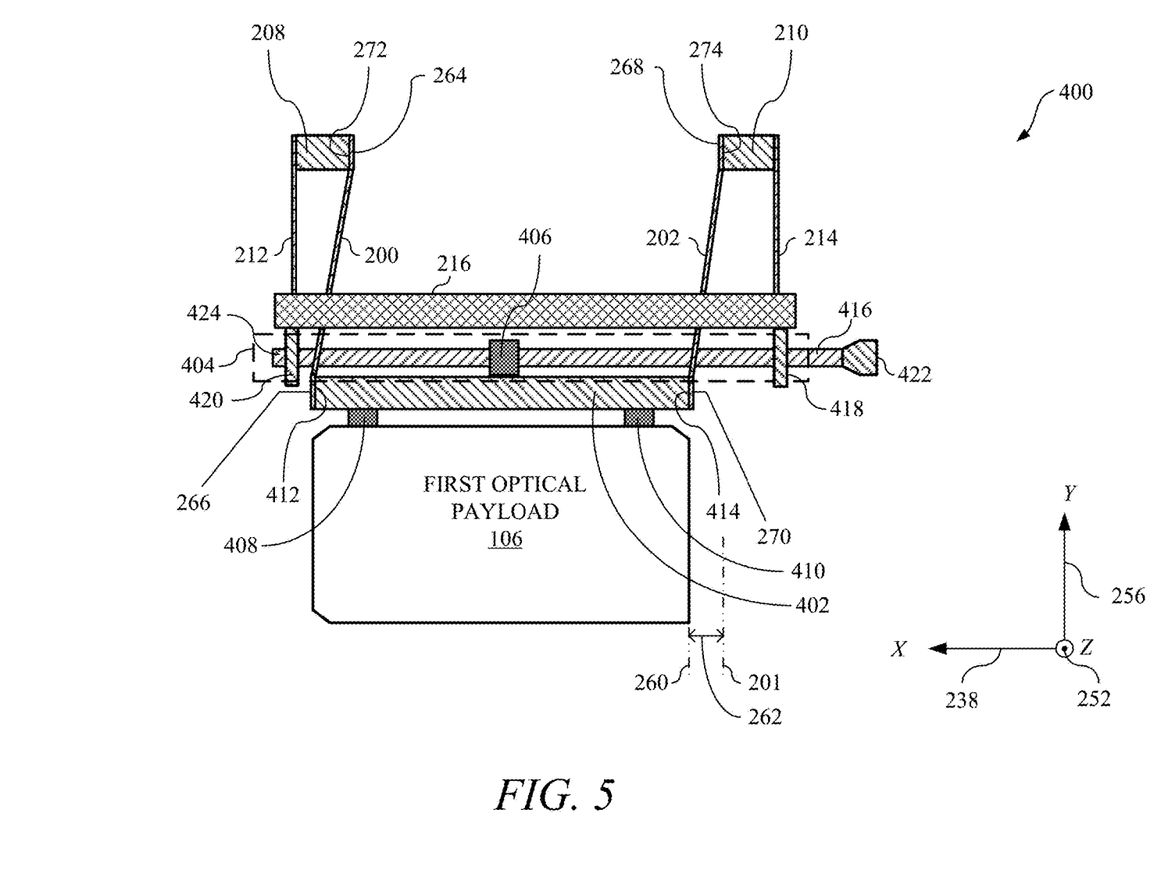
FIG. 5 is a front-view of the PBFM, shown in FIG. 4, in a second position in accordance with the present disclosure.

In FIG. 5, a front-view of the PBFM 400 is shown in the second position 260 in accordance with the present disclosure. Similar to the example in FIG. 3, in this example, the second position 260 is horizontally to the left of the first position 201 in the X-direction 238, where the first 201 and second 260 positions are separated by a translation distance 262 that may be equal to approximately 4.5 mm. In this example, movement to the left along the X-direction 238 is defined as the positive movement of the first optical payload 106, while movement to the right along the negative X-direction 238 is defined as a negative movement of the first optical payload 106. As discussed previously, the total movement of the first optical payload 106 may be approximately 9 mm (i.e., approximately +/−4.5 mm in each direction along the X-direction 238). Similarly, the second optical payload 108 may also have a total movement of approximately 9 mm (i.e., approximately +/−4.5 mm), such that the total movement between both the first 106 and second 108 optical payloads may be as much as, for example, approximately 18 mm. Using this range of approximately +/−9 mm, the horizontal translation mechanism 206 is configured to allocate approximately 0.1 mrads angle error (i.e., $\theta_x$) over an entire IPD range of approximately 53 mm to 71 mm, while maintaining a vertical misalignment (in the Y-direction 256) of approximately 0.1 mrads angle error (i.e., 0). These values correspond to approximately +/−4.5 mm (per eye of the user) of travel in the horizontal direction (i.e., X-direction 238) with less than approximately 0.1 mm of error between the right and left eyes in the vertical direction (i.e., Y-direction 256) and less then approximately 0.1 mm of error between the right and left eyes in the normal direction of sight (i.e., Z-direction 252).

Specifically, as discussed earlier, the horizontal translation mechanism 404 is configured to provide an actuation force coincident with the center of force of the flexures to reduce or eliminate moment forces which could induce angular errors $\theta_y$. In an example of operation, the screw 416 may be manual adjusted by the user using finger actuation with reasonable torque loading.

In response, the screw 416 will cause the threads of the screw 416 to move in a helical fashion in a positive or negative horizontal direction along the X-direction 238. The resulting movement of the threads of the screw 416 will cause the movement of the attachment node 406. Since the attachment node 406 is attached to the mounting platen 402, the mounting platen 402 will also corresponding move in the direction of the attachment node 406 in either positive or negative horizontal direction along the X-direction 238. However, since the mounting platen 402 is attached to the first 200 and second 202 flexures at the first 412 and second 414 ends of the mounting platen 402, the movement of the mounting platen 402 will produce a lateral force that will correspondingly cause flexures to deflect in the direction of motion of the mounting platen 402. In this example, the lateral force is shown to deflect the flexures to the left of the first position 201 but it is appreciated that if the mounting platen 204 were to move in the opposite direction, the lateral force would deflect the flexures to the right of the first position 201.

Specifically, as the mounting platen 204 moves in the x-direction 238, the movement deflects the flexures to the left to the second position 260 from the first position 201. As a result, the flexures are deflected to the left causing a bending in the flexures between the first attachment portion 264 and the second attachment portion 266 of the first flexure 200. The first attachment portion 264 is attached to the first surface 272 of the first anchoring member 208 and the second attachment portion 266 is attached to the first end 412 of the mounting platen 402. The parallel arrangement of the flexures provides a smooth and accurate transition along the translation distance 262 from the first position 201 to the second position 260 while mitigating variation errors in the vertical direction (i.e., Y-direction 256).

In this example, the screw 416 may include a rotational clutch friction based adjustment system to maintain a set position of the mounting platen 402. Alternatively, or in addition, the horizontal translation mechanism 404 may also include a clutch friction based adjustment system to maintain the set position of the mounting platen 402. The horizontal translation mechanism 404 may also include springs (not shown) or other preloading devices to reduce or eliminate any backlash with the movement of the mounting platen 402.

Figure 6:
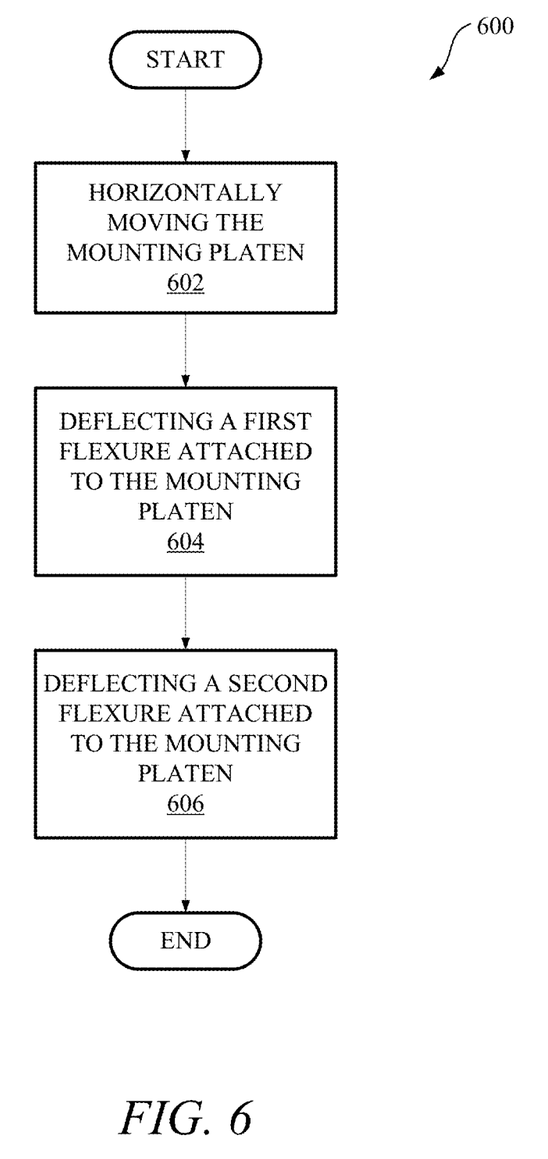
FIG. 6 is a flowchart illustrating an example of an implementation of a method performed by the PBFM in accordance with the present disclosure.

Turning to FIG. 6, a flowchart 600 illustrating an example of an implementation of a method performed by the PBFM is shown in accordance with the present disclosure. In this example, the PBFM performs a method for adjusting the IPD of an optical device (such as, for example, MR headset 100) having an optical payload (either 106 or 108). The method includes horizontally moving 602 the mounting platen (either 204 or 402) attached to the optical payload (either 106 or 108) with the horizontal translation mechanism (either 206 or 404) that is coupled to the mounting platen. In response, deflecting 604 the first flexure 200 attached to the mounting platen in response to horizontally moving the mounting platen. In this example, the first flexure 200 is deflected by a lateral force caused by first anchoring member 208 and the first end (either 218 or 412) of the mounting platen (either 204 or 402) acting on the first flexure 200. The method also includes simultaneously deflecting 606 the second flexure 202 attached to the mounting platen (either 204 or 402) in response to horizontally moving the mounting platen (either 204 or 402), thereby adjusting the IPD of the optical device (such as, for example, the MR headset 100). In this example, the second flexure 202 is deflected by another lateral force caused by second anchoring member 210 and the second end (either 220 or 414) of the mounting platen (either 204 or 402) acting on the first flexure 200. The method then ends.

In this example, as discussed earlier, the horizontal translation mechanism may be the horizontal translation mechanism 206 (described in FIGS. 2A through 3) utilizing the adjustment wheel 228, rotatable cylinder 230, and cord 232 in combination with the attachment node 226 or the horizontal translation mechanism 404 (described in FIGS. 4 and 5) utilizing the screw 416 in combination with the attachment node 406. Alternatively, the horizontal translation mechanism may include a worm screw (not shown) in combination with an attachment node that is (as described earlier) a worm gear surface that may run along the surface of the mounting platen or an attachment node that has a top surface that includes threads that couple to the threads of the screw so as to move the attachment node (and correspondingly the mounting platen) horizontally along the threads of the screw.

The disclosure presented herein may be considered in view of the following clauses.

Clause A: A system for adjusting a distance between a first optical payload and a second optical payload of an optical device, the system comprising: a first flexure and a second flexure, wherein the first flexure is parallel to the second flexure; a mounting platen having a first end and a second end, wherein the first end of the mounting platen is attached to the first flexure and the second end of the mounting platen is attached to the second flexure, wherein the first flexure and the second flexure extend from the mounting platen in a vertical direction, and wherein the first optical payload is attached to the mounting platen; a first anchoring member, wherein the first anchoring member is attached to a first end of the first flexure that is opposite a second end of the first flexure, wherein the mounting platen is attached to the second end of the first flexure; a second anchoring member, wherein the second anchoring member is attached to a first end of the second flexure that is opposite a second end of the second flexure, wherein the mounting platen is attached to the second end of the second flexure; a third flexure and a fourth flexure, wherein the third flexure is parallel to the fourth flexure, wherein the first anchoring member is attached to a first end of the third flexure that is opposite a second end of the third flexure, wherein the second end of the third flexure is attached to a frame of the optical device, wherein the second anchoring member is attached to a first end of the fourth flexure that is opposite a second end of the fourth flexure, wherein the second end of the fourth flexure is attached to the frame of the optical device; means for translation attached to the mounting platen, wherein the translation means is configured to translate the mounting platen in a horizontal direction by bending the first flexure, the second flexure, the third flexure, and the fourth flexure thereby adjusting the distance between the first optical payload and the second optical payload.

Clause B: The system of Clause A, wherein the first flexure is attached to a first side of the first anchoring member that is opposite a second side of the first anchoring member, wherein the third flexure is attached to the second side of the first anchoring member, wherein the second flexure is attached to a first side of the second anchoring member that is opposite a second side of the second anchoring member, wherein the fourth flexure is attached to the second side of the second anchoring member.

Clause C: The system of Clauses A through B, further including a fifth flexure, a sixth flexure, a seventh flexure, and an eighth flexure, wherein the first end of the mounting platen is attached to the fifth flexure and the second end of the mounting platen is attached to the seventh flexure, wherein the fifth flexure and the seventh flexure extend from the mounting platen in a vertical direction; a third anchoring member, wherein the third anchoring member is attached to a first end of the fifth flexure that is opposite a second end of the fifth flexure, wherein the mounting platen is attached to the second end of the fifth flexure; a fourth anchoring member, wherein the fourth anchoring member is attached to a first end of the seventh flexure that is opposite a second end of the seventh flexure, wherein the mounting platen is attached to the second end of the seventh flexure, wherein the third anchoring member is attached to a first end of the sixth flexure that is opposite a second end of the sixth flexure, wherein the second end of the sixth flexure is attached to the frame of the optical device, wherein the fourth anchoring member is attached to a first end of the eighth flexure that is opposite a second end of the eighth flexure, wherein the second end of the eighth flexure is attached to the frame of the optical device.

Clause D: The system of Clauses A through C, wherein the fifth flexure, the sixth flexure, the seventh flexure, and the eighth flexure are in a parallel configuration.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different features as compared to other desirable examples. The example, or examples, selected are chosen and described in order to best explain the principles of the examples, the practical application, and to enable others of ordinary skill in the art to understand the disclosure for various examples with various modifications as are suited to the particular use contemplated.

What is claimed is:

1. A system for adjusting a distance between a first optical payload and a second optical payload of an optical device, the system comprising:
   a first flexure and a second flexure, wherein the first flexure is parallel to the second flexure;
   a mounting platen having a first end and a second end, wherein the first end of the mounting platen is attached to the first flexure and the second end of the mounting platen is attached to the second flexure, wherein the first flexure and the second flexure extend from the mounting platen in a vertical direction, and wherein the first optical payload is attached to the mounting platen;
   a first anchoring member, wherein the first anchoring member is attached to a first end of the first flexure that is opposite a second end of the first flexure, wherein the mounting platen is attached to the second end of the first flexure;
   a second anchoring member, wherein the second anchoring member is attached to a first end of the second flexure that is opposite a second end of the second flexure, wherein the mounting platen is attached to the second end of the second flexure;
   a third flexure and a fourth flexure, wherein the third flexure is parallel to the fourth flexure, wherein the first anchoring member is attached to a first end of the third flexure that is opposite a second end of the third flexure, wherein the second end of the third flexure is attached to a frame of the optical device, wherein the second anchoring member is attached to a first end of the fourth flexure that is opposite a second end of the fourth flexure, wherein the second end of the fourth flexure is attached to the frame of the optical device;
   a translation mechanism attached to the mounting platen, wherein the translation mechanism is configured to translate the mounting platen in a horizontal direction by bending the first flexure, the second flexure, the third flexure, and the fourth flexure thereby adjusting the distance between the first optical payload and the second optical payload, wherein the translation mechanism comprises an adjustment wheel for causing translation of the mounting platen in response to a rotation of the adjustment wheel.

2. The system of claim 1, wherein the first flexure is attached to a first side of the first anchoring member that is opposite a second side of the first anchoring member, wherein the third flexure is attached to the second side of the first anchoring member, wherein the second flexure is attached to a first side of the second anchoring member that is opposite a second side of the second anchoring member, wherein the fourth flexure is attached to the second side of the second anchoring member.

3. The system of claim 1, further including:
   a fifth flexure, a sixth flexure, a seventh flexure, and an eighth flexure, wherein the first end of the mounting platen is attached to the fifth flexure and the second end of the mounting platen is attached to the seventh flexure, wherein the fifth flexure and the seventh flexure extend from the mounting platen in a vertical direction;
   a third anchoring member, wherein the third anchoring member is attached to a first end of the fifth flexure that is opposite a second end of the fifth flexure, wherein the mounting platen is attached to the second end of the fifth flexure;
   a fourth anchoring member, wherein the fourth anchoring member is attached to a first end of the seventh flexure that is opposite a second end of the seventh flexure, wherein the mounting platen is attached to the second end of the seventh flexure, wherein the third anchoring member is attached to a first end of the sixth flexure that is opposite a second end of the sixth flexure, wherein the second end of the sixth flexure is attached to the frame of the optical device, wherein the fourth anchoring member is attached to a first end of the eighth flexure that is opposite a second end of the eighth flexure, wherein the second end of the eighth flexure is attached to the frame of the optical device.

4. The system of claim 3, wherein the fifth flexure, the sixth flexure, the seventh flexure, and the eighth flexure are in a parallel configuration.

5. A parallel beam flexure mechanism ("PBFM") for adjusting an interpupillary distance ("IPD") of an optical device, the PBFM comprising:
a first flexure and a second flexure;
a mounting platen having a first end and a second end, wherein the first end of the mounting platen is attached to the first flexure and the second end of the mounting platen is attached to the second flexure;
an optical payload attached to the mounting platen;
a horizontal translation mechanism attached to the mounting platen, wherein the horizontal translation mechanism is configured to translate the mounting platen in a horizontal direction by bending the first and second flexures, thereby adjusting the IPD of the optical device, wherein the horizontal translation mechanism comprises an adjustment wheel for causing translation of the mounting platen in response to a rotation of the adjustment wheel; and
a first and second anchoring members, wherein the first flexure is attached to the first anchoring member and second flexure is attached to the second anchoring member, wherein the first anchoring member and the second anchoring member are attached to a body of the optical device, the PBFM further including a frame attached to the horizontal translation mechanism and a third flexure attached to the first anchoring member and a fourth flexure attached to the second anchoring member, wherein the third and fourth flexure are also attached to the frame.

6. The PBFM of claim 5, further including:
a third and fourth anchoring members,
a fifth and sixth flexures attached to the third anchoring member,
a seventh and eighth flexures attached to the fourth anchoring member,
wherein the fifth and seventh flexures are attached to the mounting platen, and
wherein the sixth flexure and eighth flexures are attached to the frame.

7. The PBFM of claim 5, wherein the adjustment wheel is coupled to the frame, and the horizontal translation mechanism further includes
a rotatable cylinder coupled to the frame,
an attachment node, and
a cord,
wherein the cord is attached to the attachment node and the adjustment wheel and is configured to move over the rotatable cylinder in response to a rotation of the adjustment wheel, and
wherein the attachment node is attached to the mounting platen and is configured to move the mounting platen in the horizontal direction along the cord.

* * * * *